United States Patent
Luu et al.

(10) Patent No.: US 12,165,238 B2
(45) Date of Patent: Dec. 10, 2024

(54) EMERGENCY AD HOC DEVICE COMMUNICATION MONITORING

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 104 days.

(21) Appl. No.: 17/932,867

(22) Filed: Sep. 16, 2022

(65) Prior Publication Data

US 2024/0095968 A1     Mar. 21, 2024

(51) Int. Cl.
*H04W 4/90*          (2018.01)
*G06T 11/00*       (2006.01)

(52) U.S. Cl.
CPC .......... *G06T 11/00* (2013.01); *G06T 2200/24* (2013.01); *G06T 2210/62* (2013.01); *H04W 4/90* (2018.02)

(58) Field of Classification Search
CPC ................................ G06T 19/006; H04W 4/90
See application file for complete search history.

(56) References Cited

U.S. PATENT DOCUMENTS

| | | | | |
|---|---|---|---|---|
| 2006/0215035 A1* | 9/2006 | Kulas | .................. | G08B 25/016 348/207.99 |
| 2009/0033505 A1* | 2/2009 | Jones | ..................... | G08B 25/10 340/657 |
| 2017/0311131 A1* | 10/2017 | South | ........................ | G01S 5/14 |
| 2023/0145066 A1* | 5/2023 | Jeong | ..................... | G08B 7/062 705/324 |
| 2023/0162396 A1* | 5/2023 | German | ..................... | G01S 5/16 345/633 |

* cited by examiner

*Primary Examiner* — Ryan McCulley
(74) *Attorney, Agent, or Firm* — Guntin & Gust, PLC; Matthew Tropper

(57) ABSTRACT

The disclosed technology is directed towards presenting communications data to a responding entity that are relevant to an emergency situation at an emergency location. The communications data can be obtained from communications (e.g., text messages, transmitted video, voice calls and the like) that involve at least one user device at the situation, including communications that do not involve the responding entity. Users may opt in to such an emergency service to allow access to their communications, whereby their device locations are tracked and known in the event of an emergency. Upon obtaining the communications data, a responder can receive a view of the scene augmented with the communications data. The view can include a three-dimensional and/or two-dimensional representation of the zone/area of the emergency situation. Filtering can be used to eliminate irrelevant communications, and summarization can be used to combine generally redundant communications.

20 Claims, 16 Drawing Sheets

EMERGENCY AD HOC DEVICE COMMUNICATION MONITORING

TECHNICAL FIELD

The subject application relates to device communications during an emergency, and related embodiments.

BACKGROUND

Responders to an emergency situation need relevant information to assist in determining a plan of action and to help make other decisions. There may be significantly useful information exchanged between one or more persons involved in the situation, yet responders do not have access to such information.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
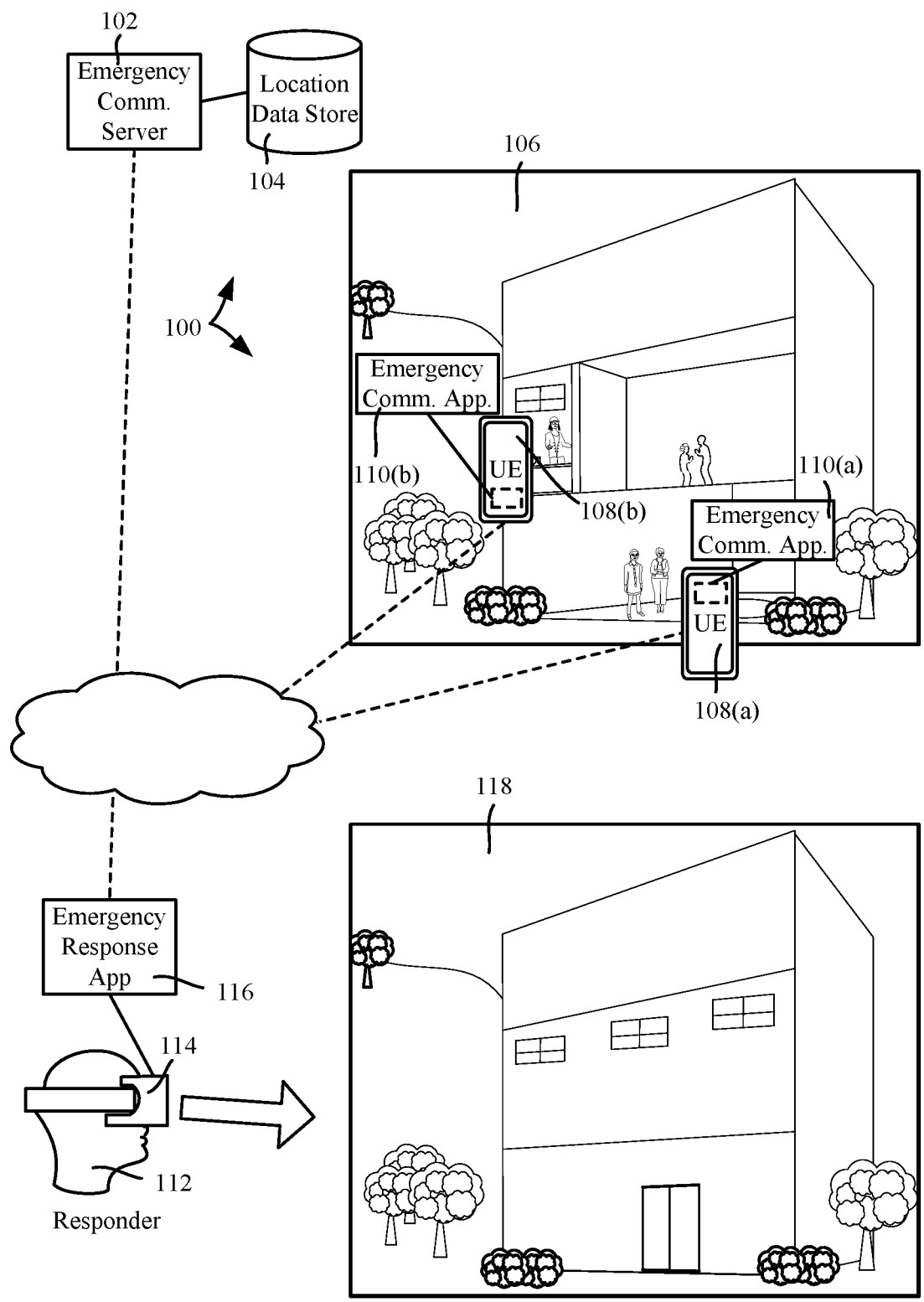
FIG. 1 is a block diagram of an example system and example representations related to monitoring of emergency communications, in accordance with various aspects and embodiments of the subject disclosure.

The technology described herein is generally directed towards facilitating the activation of a number of devices to act as an ad hoc cluster of devices to receive communication data for analysis based on the occurrence of an event, such as an emergency. The devices need not have any prior relationship before or after the event. Their identification as members of the cluster may be made based on one or more factors, such as their location during a period of time.

The technology described herein thus provides responders to an emergency situation with access to communications to and from persons that are involved in the situation, typically at least one directly involved person, which may provide information that would be helpful to the responders in handling the situation. Notably, these are communications that a user conducts that do not require the user to be in communication with any emergency response personnel. Involved person(s) may be communicating information, such as using audio, text, and video communication application program on their devices. Some of this information may be pertinent to the situation, and the technology described herein enables responders to have access to communication streams that are pertinent to the emergency situation, e.g., temporarily as needed, when the person(s) involved have opted into an emergency service.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising an emergency communications (comm.) server 102 coupled to a location data store (e.g., database) 104. As described herein and in general, the emergency communications server 102 is configured to present communication data in the event of an emergency based on device location information obtained via the location data store 104 as described herein. Note that an example embodiment described herein is that of a responding entity viewing the scene of an emergency; however other embodiments may use such communication data as appropriate, e.g., command center personnel planning a response.

Consider by way of example, various persons each equipped with a communication device such as a smart phone, smart watch, and/or other device or devices. The device(s) may have location, camera, and voice/data/video communication capabilities. As shown in the example "open-face" three-dimensional structure representation 106 of FIG. 1, two devices (user equipment, or UEs in this example) 108(*a*) and 108(*b*) may also have respective instances 110(*a*) and 110(*b*) of an emergency communications application program (app).

Note that white two such user devices are shown in the example of FIG. 1, at least one user within the emergency situation area is equipped with an instance of the emergency communication app on his or her device. In any event, each person's communication device 110 can detect its current location and register the location and device identity in the location data store 104, e.g., periodically.

A responding entity (which may be a responder person such as 112, or non-human responder such as an automated device) may be equipped with an extended (e.g., augmented) reality viewer 114, which can be equipped with a video camera and LIDAR (light detection and ranging) capabilities as well as headphones and a microphone. In a non-emergency situation, the responder's view 118 of the same three-dimensional structure can be a regular image (e.g., as maintained on an interactive map), or possibly semi-transparent in which rooms and the like are visible within, but occupants are generally not.

In this example, the responder's equipment includes an emergency response application program (app) 116, e.g., incorporated into the augmented reality viewer 114 or coupled thereto via another device. The emergency response application program 116 is in communication over a network to the emergency communication server 102.

Figure 2:
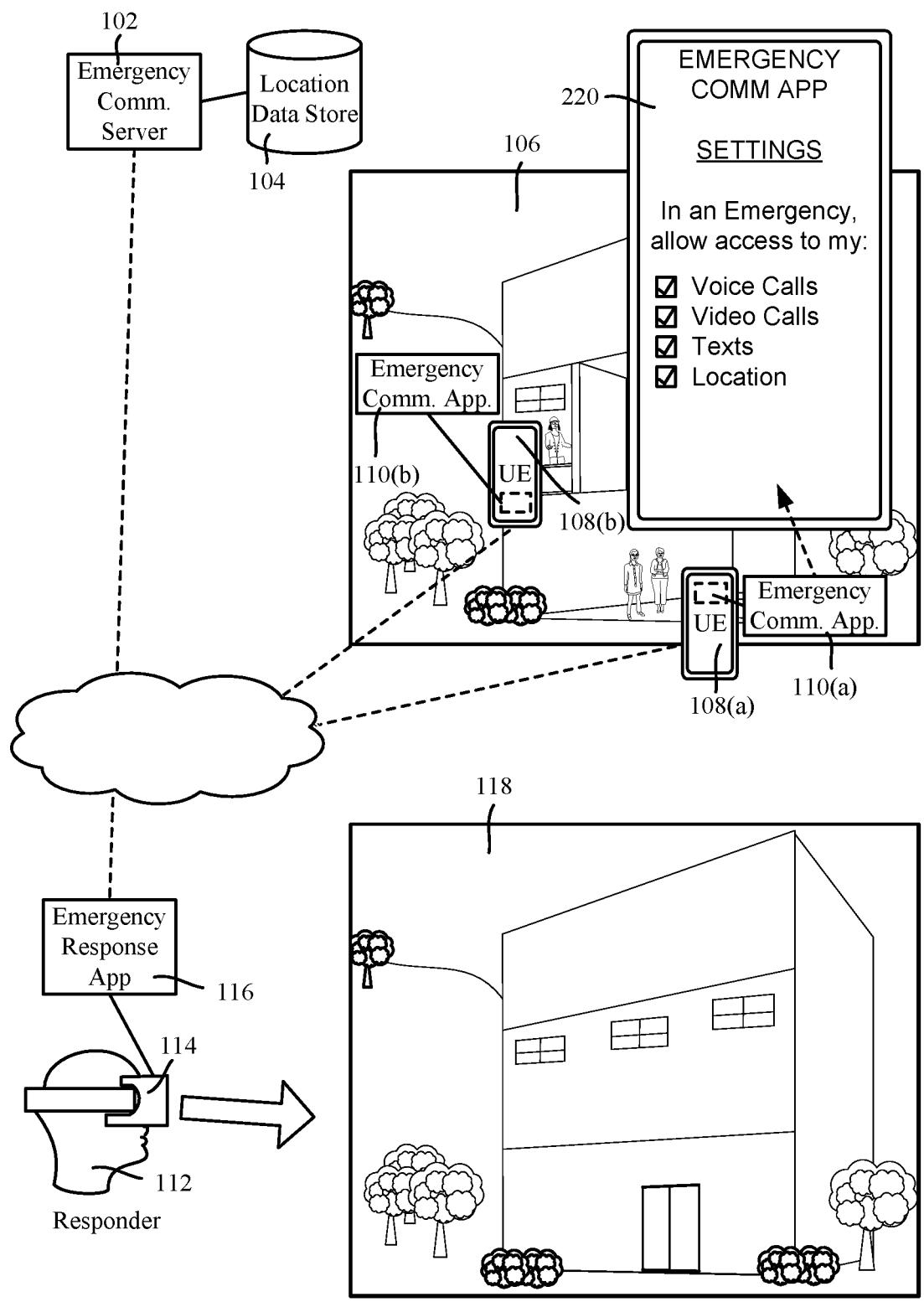
FIG. 2 is a block diagram of an example system and example representations, including an interactive user interface of an emergency communications application program on a user device, in accordance with various aspects and embodiments of the subject disclosure.

FIG. 2 shows an example screenshot of an interactive "settings" user interface 220 of the emergency communications app 110(a). In one embodiment, the emergency communication app 110(a) on the user devices has selectable settings on the interactive "settings" user interface 220 that allow the user to control whether or not the emergency communication server has access to which types of user communications in the event of an emergency. In this example, the settings also allow the user to control whether the emergency communication server 102 has access to the user's location in the event of an emergency. Via the settings, a user can opt-in to the emergency service provided by the system 100.

In the event that a user has allowed this access, as shown for a user of the device 108(a), the emergency communication app 110(a) has access to the user's other apps, for example via an application programming interface, to monitor other communication application programs with communications that correspond to the categories allowed. For example, if the user permits access to voice calls, the emergency communication app 110(a) is given permission to receive voice communications conducted using a phone app. Likewise, on or off settings are selectable for video calling and texting application programs. Although not explicitly shown, other communication applications (e.g., email and messaging) can be set to allow monitoring of such communications.

Figure 3:
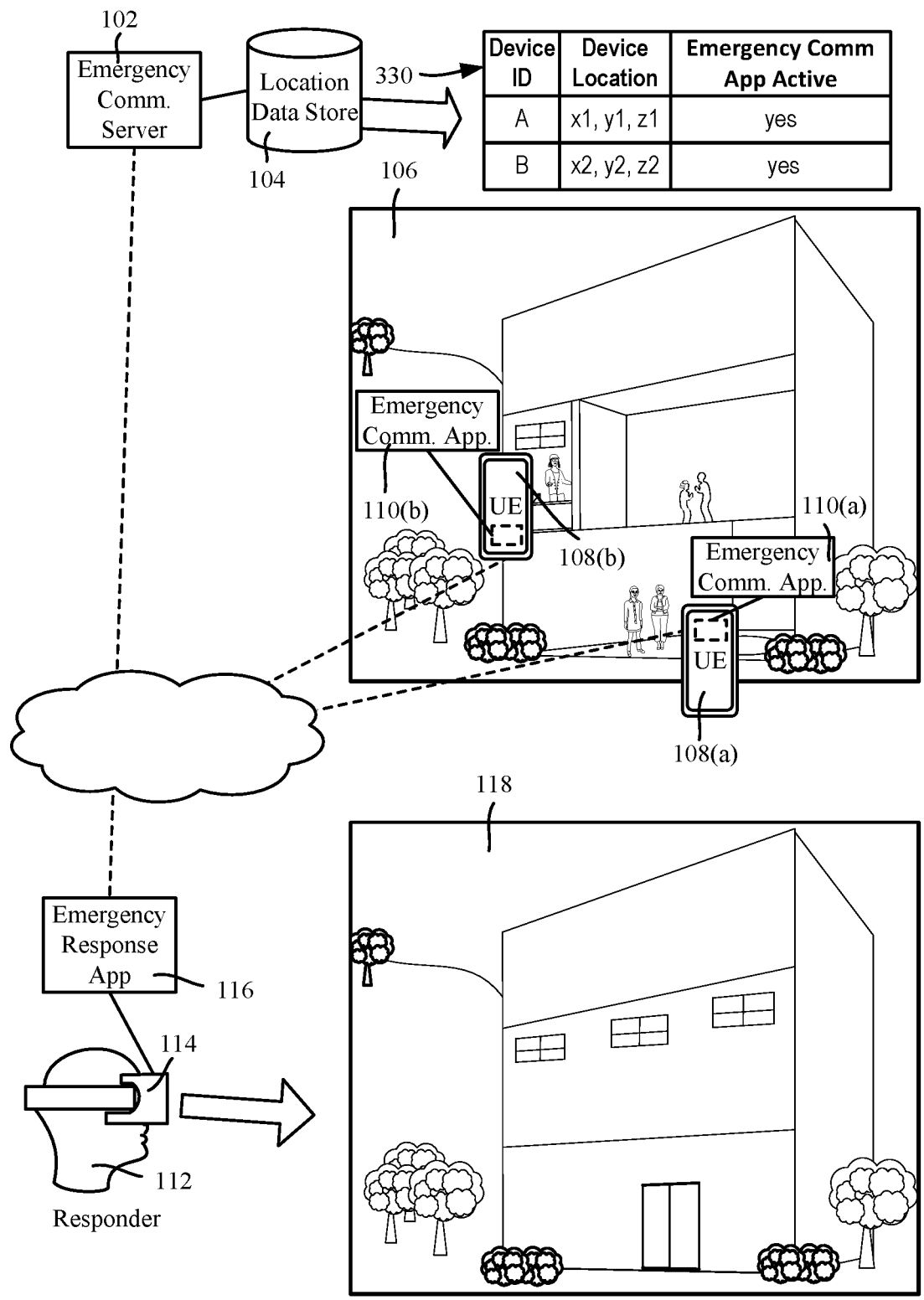
FIG. 3 is a block diagram of an example system and example location data structure containing data related to device locations and emergency communications application program state, in accordance with various aspects and embodiments of the subject disclosure.

As set forth herein and as shown in the example location data structure (e.g., set of records) 330 of FIG. 3, the user devices may periodically register with the location data store 104. In doing so, the devices register their current location and whether the emergency communication app is active on their device. Note that although not shown in FIG. 3, it is feasible to not only indicate active "yes" or not "no" but which types of communications allow for monitoring/access, e.g., voice but not text. These registrations may be periodically or occasionally made (e.g., whenever the device has been moved some threshold distance) and updated over time so that the location database 104 has a reasonably continuous record of the user's current location.

When the responder 112 arrives on the scene or is in transit thereto, the responder 112 may view an area/zone such as a building, e.g., to obtain the view 118 using the augmented reality viewer 114. The area that the responder 112 is viewing may be previously stored as a representation of location coordinates that comprise a set of location points that make up the area such as the building. The set of location points that makes up the area specified may be indicated via an augmented reality overlay using the augmented reality viewer 114.

Figure 4:
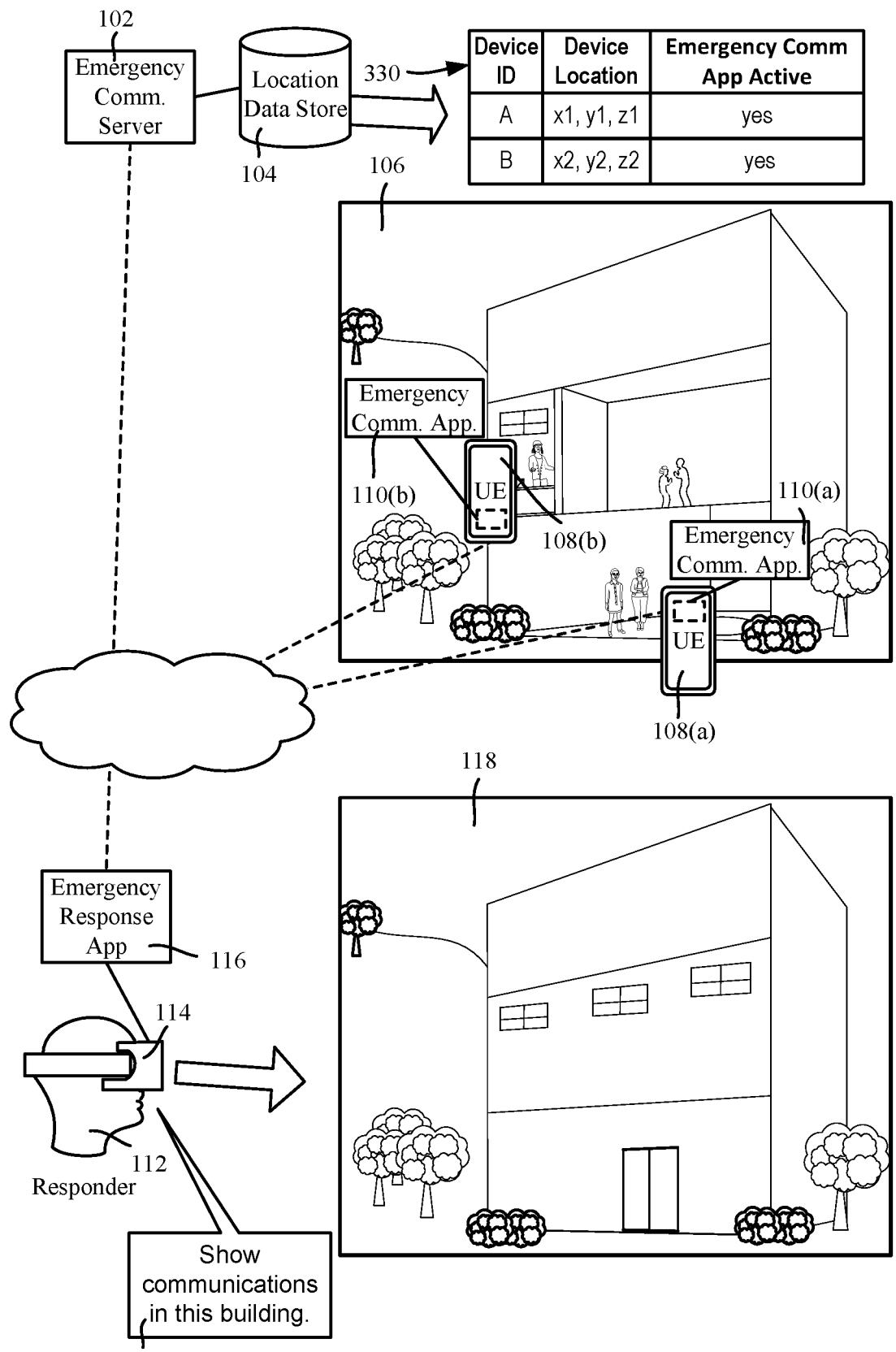
FIG. 4 is a block diagram of an example system and example representations, including receiving a command from a responder to an emergency response application program, in accordance with various aspects and embodiments of the subject disclosure.

As shown in the example of FIG. 4, the responder 112 may issue a request such as via a spoken command (block 440) or the like that is used to initiate the declaration of the emergency (if not already initiated, e.g., by a communication to which the responder 112 is responding), as well as request monitored communication data. If in transit and not yet located at the area of the emergency situation, the responder can provide more descriptive location information, e.g., "Show communications in the 123 Main Street building" and so on.

In response to the command, the set of location points that make up the area/zone specified in the request are used by the server 102/response app 116 to determine from the location data store 104 the presence of any devices that are registered with locations that correspond to the set of location points of the area. The area/zone can be larger than the building, such as to include devices of persons just outside the structure, or devices that are not located accurately enough to determine whether inside or outside the structure.

The timeframe of the monitored communications can be based on the type of emergency and when it was detected. For example, consider that a fire is called in or triggers an alarm at 8:22 pm. Communications may be relevant for some time before that; for example, a child was telling his mom at 8:21 pm that there is a fire in the room, and that he is getting out of the building. Although the device may no longer be at the location, by maintaining the location data in conjunction with the coordinates for some time, the communication at 8:21 from the location in the child's room provides useful information as to which location the responder should head towards. Thus, the timeframe may be set to start at several minutes before the emergency was officially detected or declared, so that relevant communication information can be retained and made available to responders.

Figure 5:
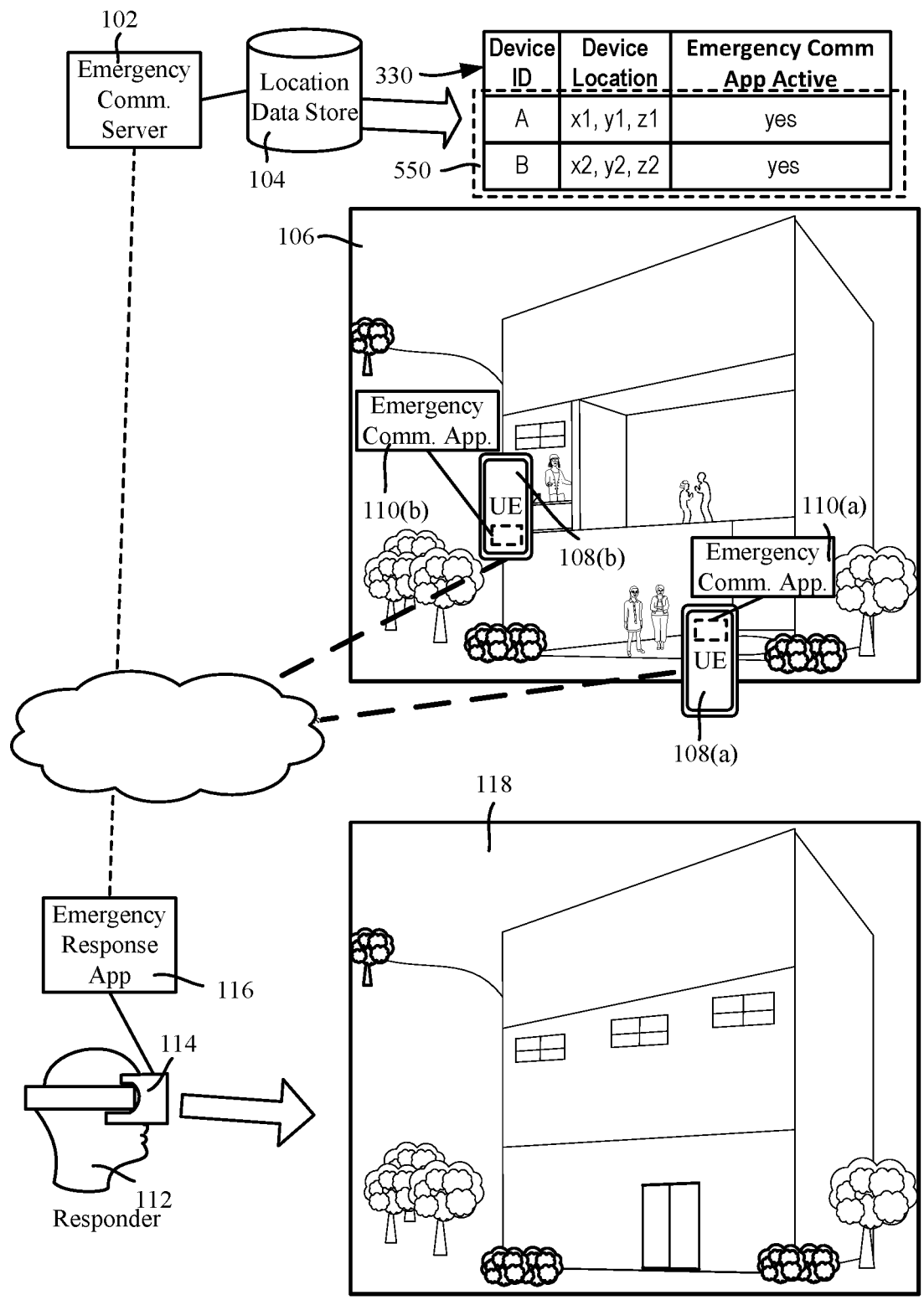
FIG. 5 is a block diagram of an example system and example location data structure, which is accessed based on the command from the responder, in accordance with various aspects and embodiments of the subject disclosure.

As shown in FIG. 5 via the dashed block 550 surrounding the entries in the location data store's data structure 330, the emergency communication server 102 matches the devices with locations corresponding to the area in the responder's view. Those devices with active emergency communication apps (device A 108(a) and device B 108(b)) are further identified. The emergency communication server 102 sends a request to each device that is identified. The emergency communication app instances 110(a) and 110(b) of the devices 108(a) and 108(b), respectively, receive the request and, depending on the user's permission settings, allow the emergency communication app access to one or more types of the user's communications (voice/text/video), as specified by the user settings. For each device and communication type where access is allowed, the emergency communications app (e.g., app instance 110(b)) receives and sends to the emergency communication server 102, along with a current location of the user device, data that represents the user's communications.

Figure 6:
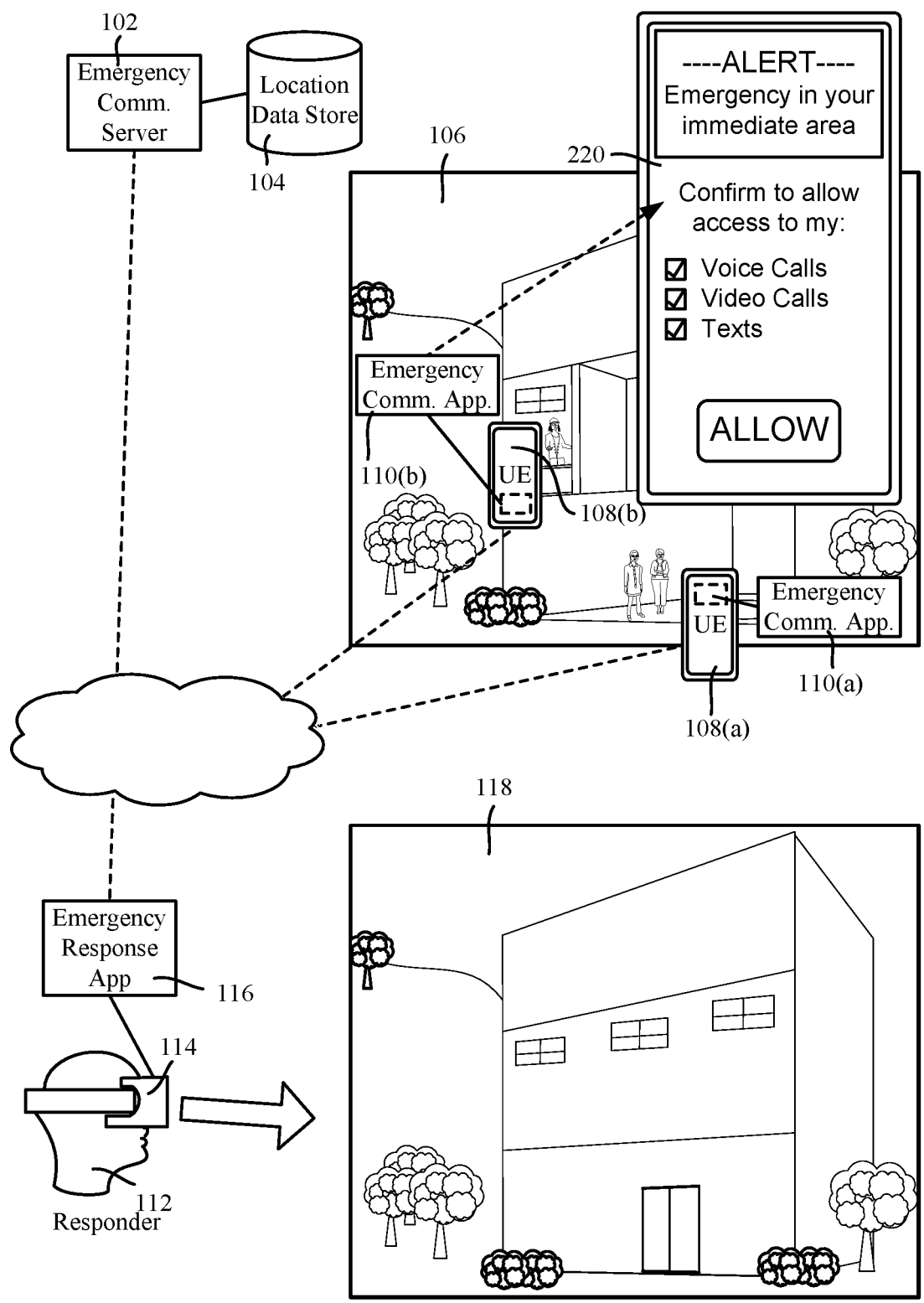
FIG. 6 is a block diagram of an example system and example representations, including an interactive user interface of an emergency communications application program on a user device with respect to an alert, in accordance with various aspects and embodiments of the subject disclosure

Optionally, as depicted in FIG. 6, users may be sent an alert to their emergency communication app (e.g., 110(b)) from the emergency communication server 102. This alert may be presented to the user via a visual or audible indication and present the user with another level of opt-in or opt-out permission granting for their communications to be monitored. In FIG. 6, the alert is shown as a visual indication, and is accompanied by a visible interactive user interface 620. It should be noted that an emergency communication app can be built into a device such that the alert can be received without the user having taken any proactive action to install it; the operating system can be configured to activate the app and output the alert, whereby the user can choose to opt-in or not as desired. In any event, the user device would still receive and (unless overridden by the user) output the alert in this "built-in" scenario.

Figure 7:
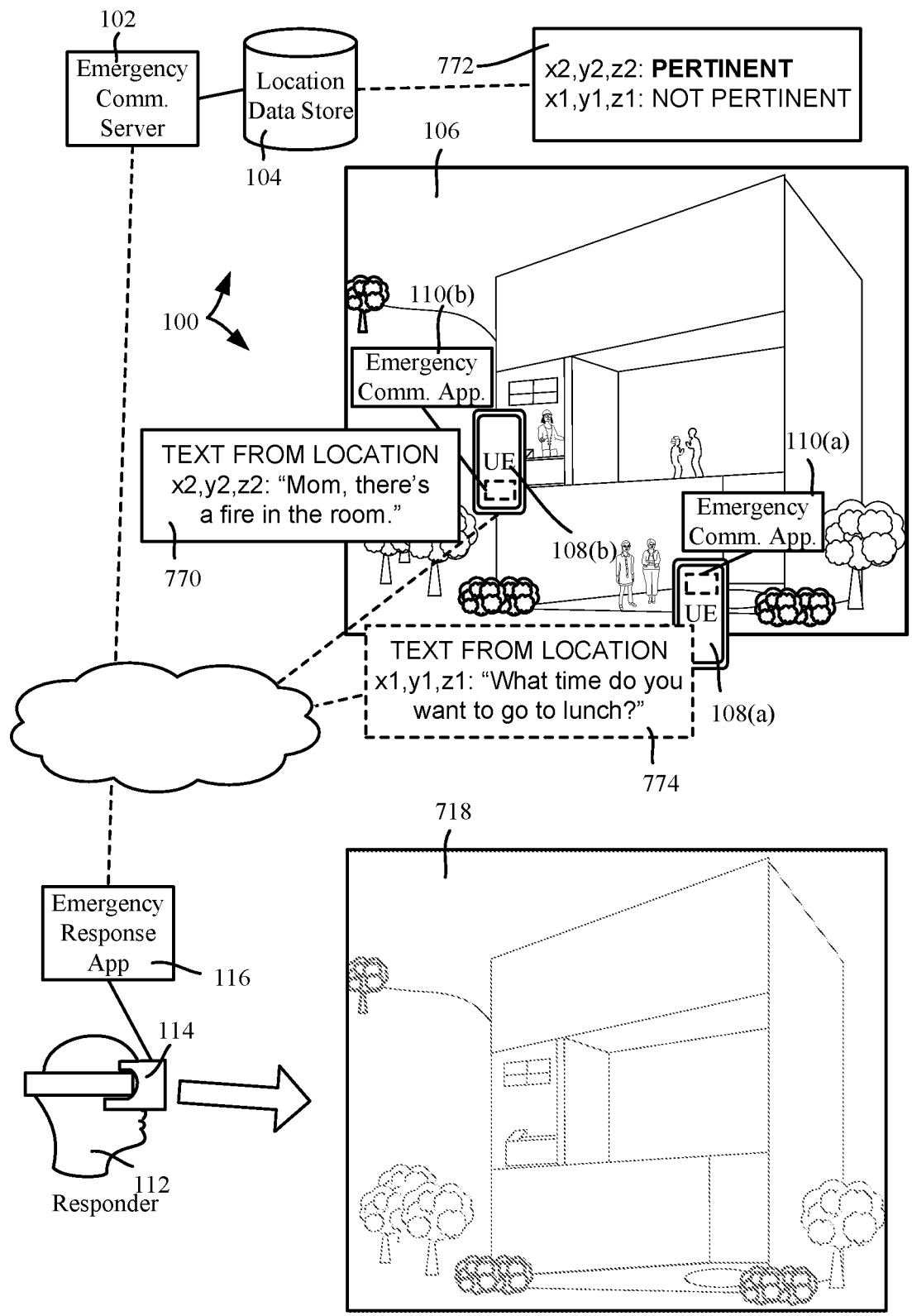
FIG. 7 is a block diagram of an example system and example representations in which data filtering separates communications pertinent to an emergency from those that are not pertinent, in accordance with various aspects and embodiments of the subject disclosure.

The emergency communication server 102 may optionally filter the data that describes the communications of the user. For example, the emergency communication server 102 may use artificial intelligence techniques or the like to predict whether communications from the user are pertinent to assist the responder in handling the situation. For example, if as shown in FIG. 7 via block 770, the content of the user's communications from location x2, y2, z2 indicate content that describes the user's situation or the situation of their surroundings, such a communication may be pertinent and presented to the responder, e.g., as determined by the server 102 (block 772). In addition to content, other information can be analyzed, e.g., tone of voice or volume can be indicative of panic even if the words are unclear. On the other hand, a communication including its content may be interpreted to be irrelevant (e.g., the text message from location x1, y1, z1 represented via block 774) and is filtered out and not (typically) presented to the responder. Note however that as described herein, the presence of a device at those coordinates along with even an irrelevant communication indicate that a person is at location x1, y1, z1, who may be told to evacuate depending on the type of emergency.

Indeed, the context of an emergency may be factored into what is shown and not shown to a responder. For example, consider a potential heart attack victim in one apartment of a multiple unit apartment. In general, the responder will see the communications from only that apartment. In contrast, for a fire in the same building, even irrelevant communications indicate the presence of a person at a certain location, which can be used to help evacuate the entire building or rescue that person. The relevant communications are still highly useful in pinpointing the location of the fire.

Note that FIG. 7 also shows to the responder a semi-transparent view 718 of the structure. For example, consider that the floor plan is registered with the county or municipality, whereby the locations of stairs, walls and other such valuable information can be represented as a three-dimensional simulated image or video to the responder.

Figure 8:
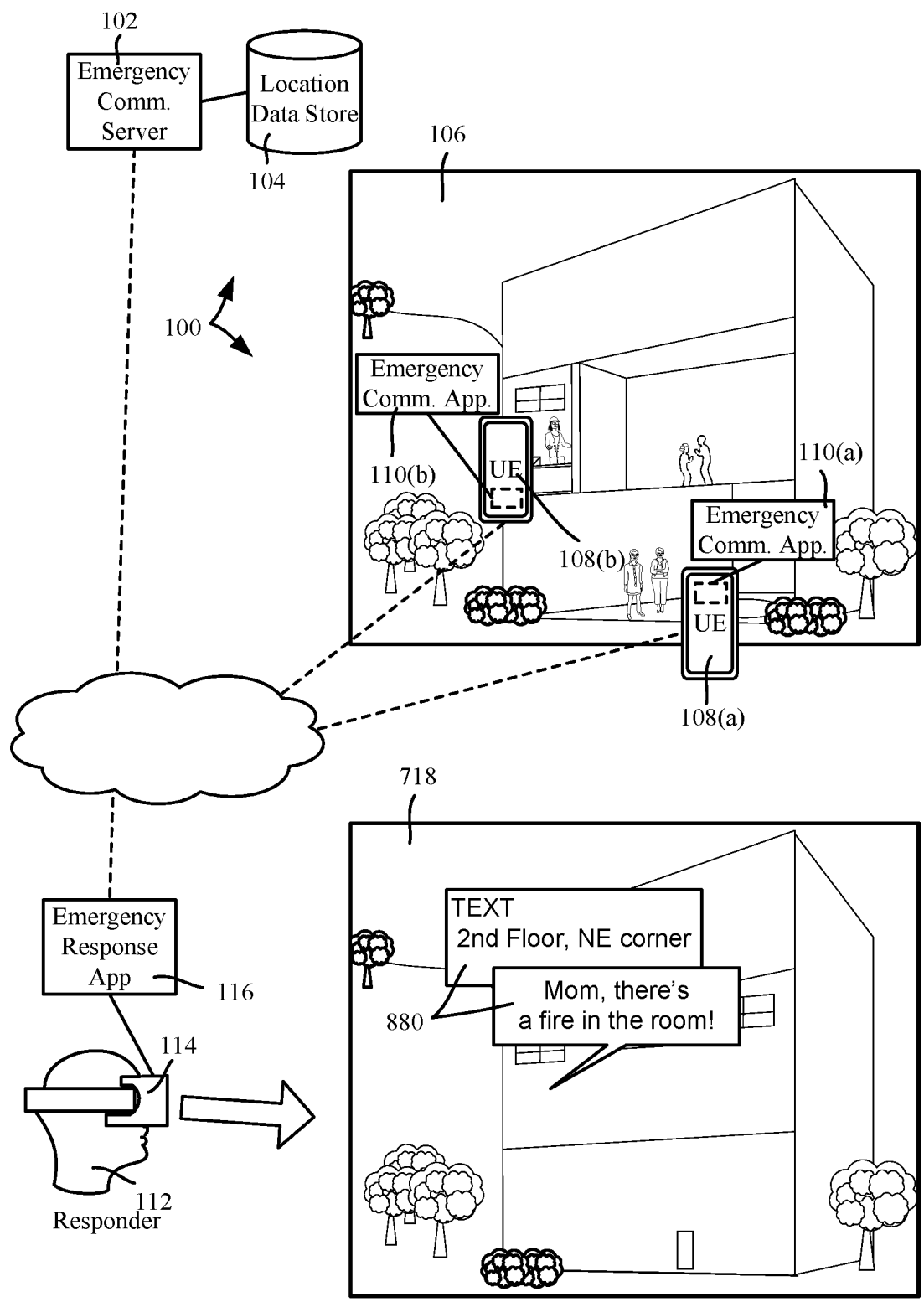
FIG. 8 is a block diagram of an example system and example representations in which augmented communication data is presented to an emergency responder viewing an image or video, in accordance with various aspects and embodiments of the subject disclosure.

FIG. 8 shows the presentation of pertinent communication data to the responder from a device, e.g., the device 108(*b*). The data can be presented on the responder's augmented reality view, e.g., the view 718, via an overlay 880 (image, graphics or the like) at a location of the augmented reality view 718 that corresponds to the user's location, which has been received from the user's device 108(*b*). Actual audio or transcribed audio may be presented, e.g., from a voice call, again shown from the user's location at the time of the communication.

Figure 9:
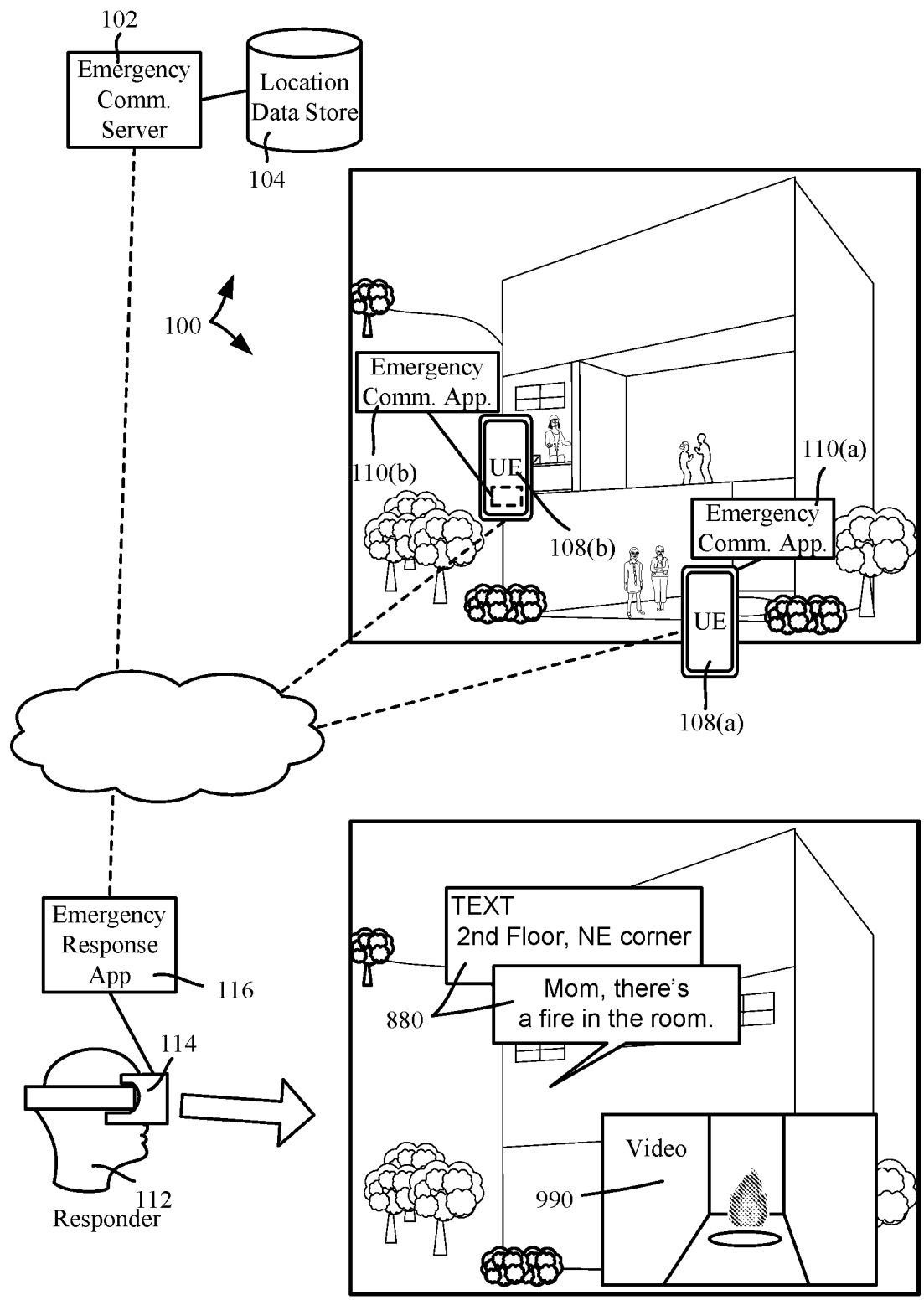
FIG. 9 is a block diagram of an example system and example representations in which augmented communication data is presented to an emergency responder along with relevant video, in accordance with various aspects and embodiments of the subject disclosure.

As shown in FIG. 9 via block 990, augmentation may be used for the presentation of voice, text, and or video communications, e.g., including from different users. In general, the responder 112 is able to control (e.g., via verbal commands) what the responder 112 sees at any given time.

Figure 10:
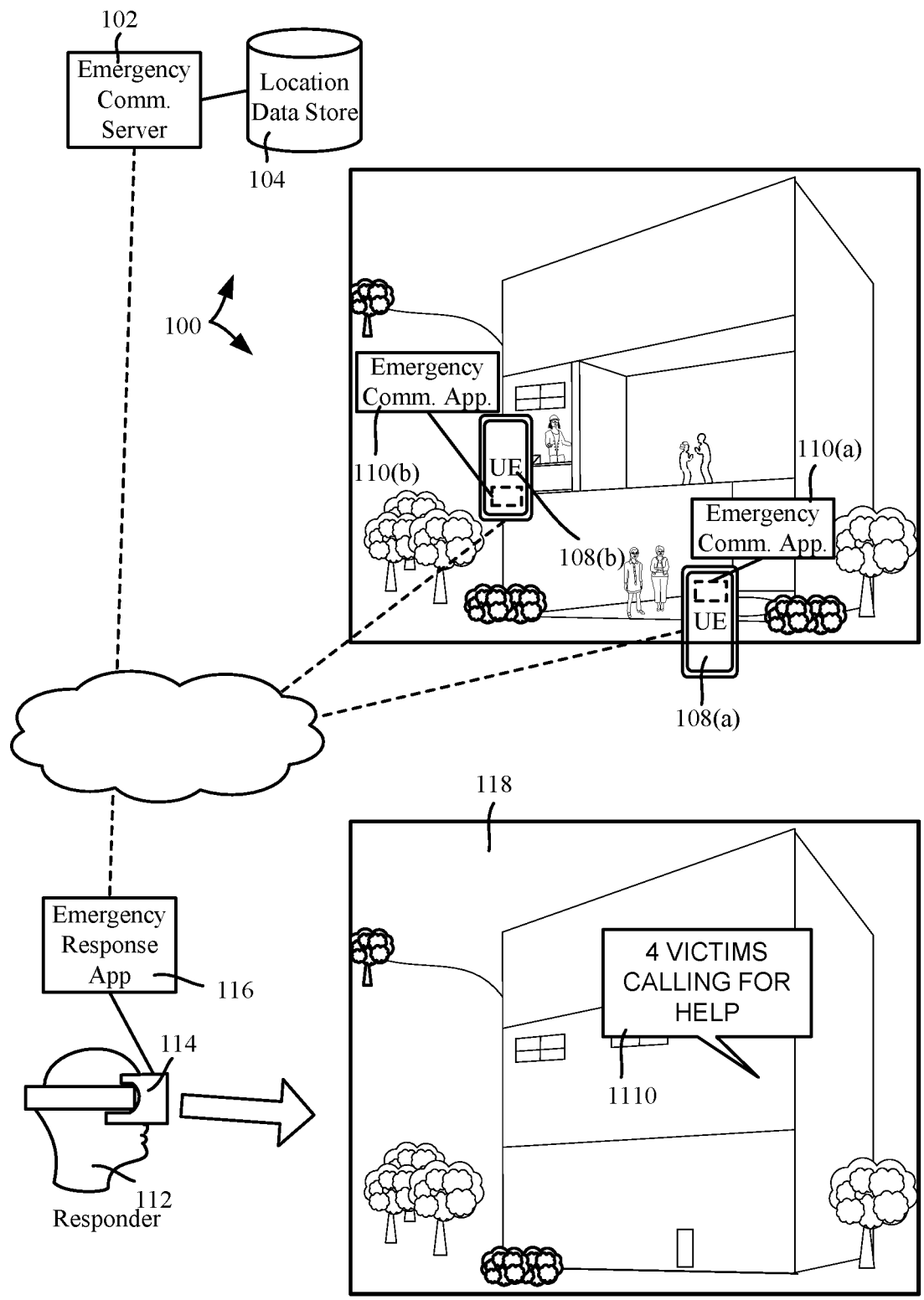
FIG. 10 is a block diagram of an example system and example representations in which augmented communication data is summarized to an emergency responder, in accordance with various aspects and embodiments of the subject disclosure.

It may be the case that there are a number of users whose communications are being collected and analyzed. In this case, this may represent an overwhelming or confusing amount of information to present to the responder 112. Therefore, in these cases, the emergency communication server 102 may analyze the user communications and determine clusters of users within an area that are exhibiting similar messages, such that the communications from those users may be summarized and their general area may be presented in a summary presentation to the responder's augmented reality view. An example of a summary presentation 1010 is shown in FIG. 10 along with a pointer to the devices general location; (multiple pointers may be displayed with respect to a summary presentation). Note that not all users need to have an instance of the emergency communications app active on their devices; the device locations within the appropriate timeframe are sufficient to recognize the likely presence of persons nearby. Further, note that while the emergency communications app eliminates the need for a direct communication to a responding entity, any direct communications can be mixed with other relevant communications; thus the summary presentation 1110 can include a mix of direct calls for help (e.g., two users) and communications between users (e.g., two other users, at least one of whom has the emergency communications app and is notifying another user of the problem).

Figure 11:
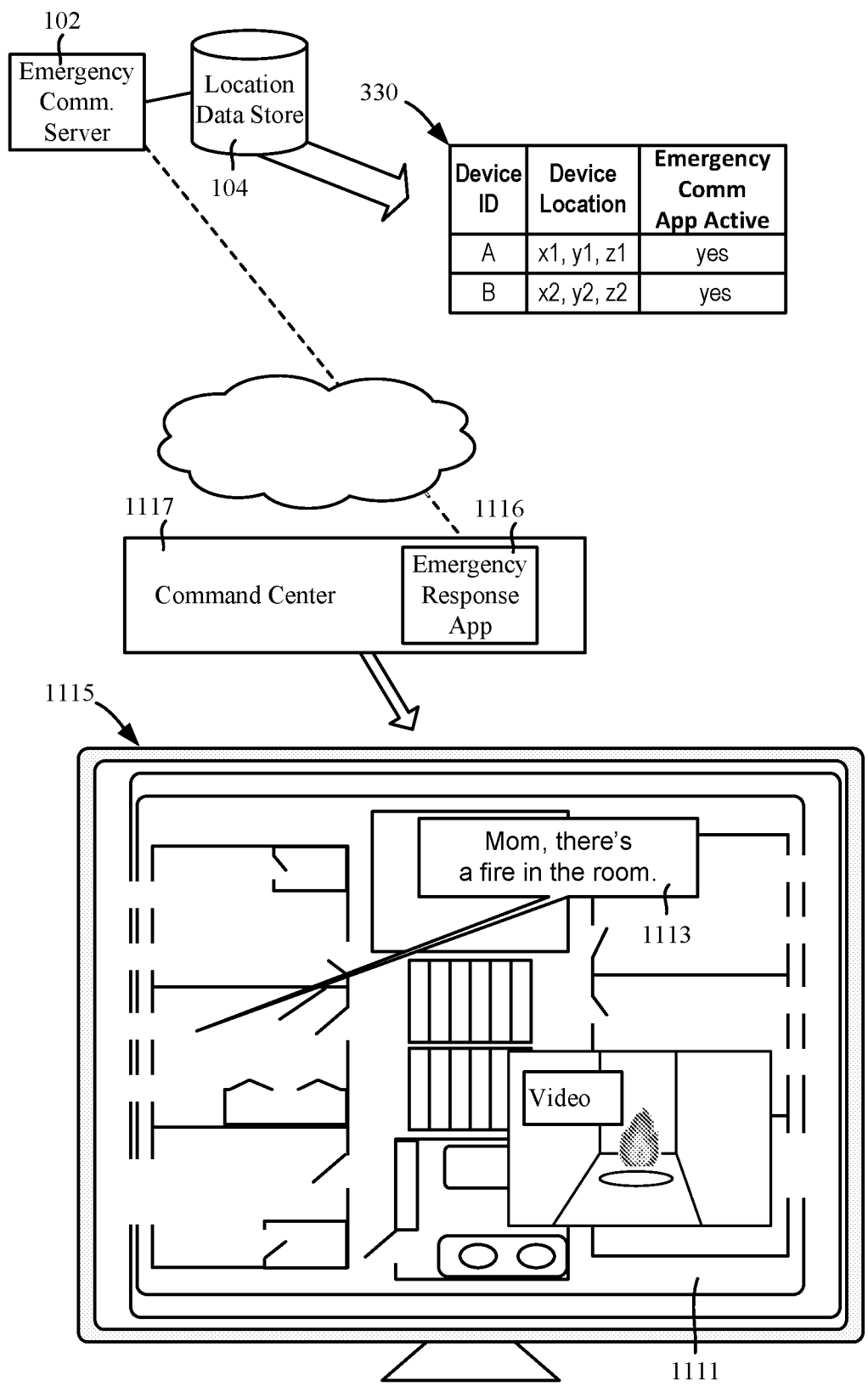
FIG. 11 is a block diagram of an example system and example representation of a two-dimensional floor plan augmented with emergency-related communication data, in accordance with various aspects and embodiments of the subject disclosure.

In an alternate environment, the communications received may be presented as overlays on a floor plan layout or other representation of the area. An example is shown in FIG. 11, where a two-dimensional floor plan 1111 is shown overlaid with relevant communication data 1113. Note that this can be viewed by a responder, but in the example of FIG. 11 is shown as being presented on a device 1115 at a command center 1117. The command center 1117 is shown as running at least one instance of the emergency response app 1116. This may be a more complex emergency response app than a responder has, such as to be able to switch among multiple emergencies from a single device.

Figure 12:
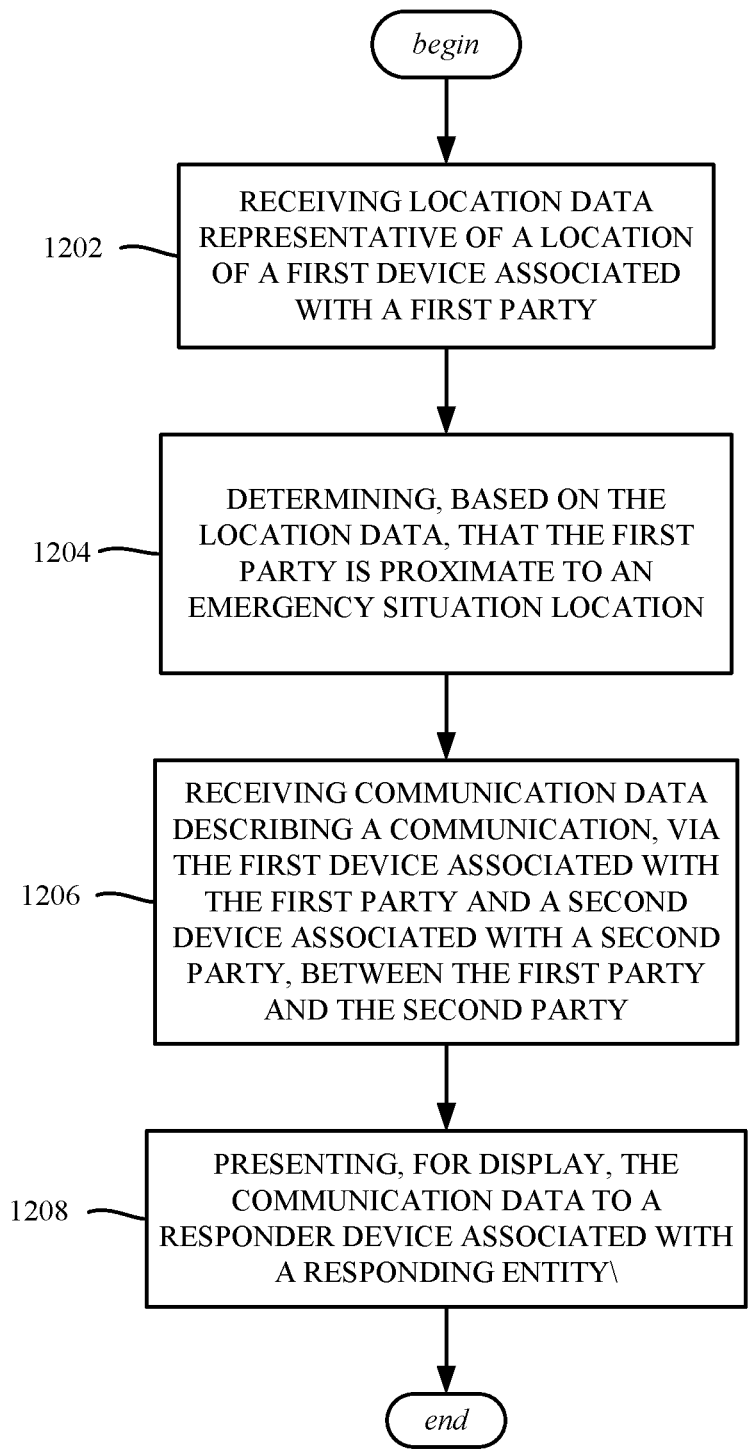
FIG. 12 is a flow diagram representing example operations related to presenting communication data relevant to an emergency situation to a responder device associated with a responding entity, in accordance with various aspects and embodiments of the subject disclosure.

One or more example aspects are represented in FIG. 12, and can correspond to a system, including a processor, and a memory that stores executable instructions that, when executed by the processor, facilitate performance of operations. Example operation 1202 represents receiving location data representative of a location of a first device associated with a first party. Example operation 1204 represents determining, based on the location data, that the first party is proximate to an emergency situation location. Example operation 1206 represents receiving communication data describing a communication, via the first device associated with the first party and a second device associated with a second party, between the first party and the second party. Example operation 1208 represents presenting, for display, the communication data to a responder device associated with a responding entity.

Further operations can include obtaining permission data from the first party indicating permission to receive the communication data describing the communication between the first party and the second party. Obtaining the permission data from the first party can include sending an alert to the first device associated with the first party, and receiving the permission data in response to the alert.

Further operations can include outputting information indicative of the location data in association with the presenting, for display, the communication data to the responder device associated with the responding entity.

The communication data describing the communication can include at least one of: audio data, text data, image data, or video data.

Further operations can include outputting directional guidance to the second device.

Receiving the communication data can include filtering the communication data from among a group of candidate communications data based on a defined emergency situation filtering criterion.

Presenting can include outputting an augmented reality presentation for display. Further operations can include accessing a data store to obtain a group of location points, and wherein the augmented reality presentation comprises augmented information based on the group of location points.

The group of location points can correspond to a structure, and outputting the augmented reality presentation can include rendering a representation of the structure based on the group of location points. Outputting of the augmented reality presentation further can include overlaying augmented information over the representation at an overlay position based on the location data.

The representation of the structure can include at least one of: a three-dimensional rendering of the structure, or a two-dimensional floor plan of a floor of the structure.

The representation of the structure can include a semi-transparent three-dimensional rendering of the structure, or a two-dimensional floor plan of a floor of the structure.

The location data can include first location data representative of a first location, the communication data can include first communication data, the communication can be a first communication, and further operations can include receiving second location data representative of a second location of a third device associated with a third party, determining, based on the second location data, that the third party is proximate to the emergency situation location, receiving second communication data describing a second communication, via the third device associated with the third party and a fourth device associated with a fourth party, between the third party and the fourth party, and presenting, for display, the second communication data to the responder device associated with the responding entity.

Figure 13:
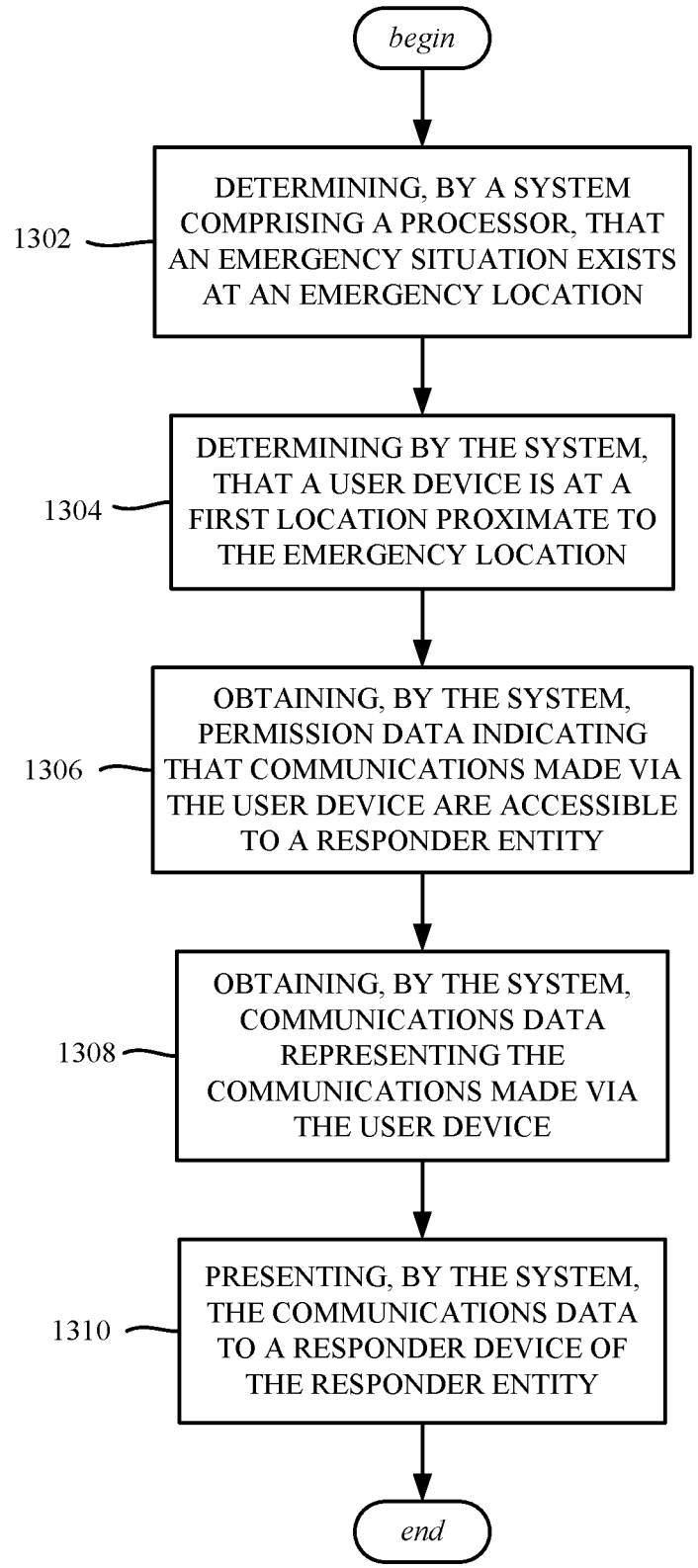
FIG. 13 is a flow diagram representing example operations related to obtaining and presenting communications data representing communications relevant to an emergency situation made via a user device, in accordance with various aspects and embodiments of the subject disclosure.

One or more example aspects are represented in FIG. 13, and, for example, can correspond to operations, such as of a method. Example operation 1302 represents determining, by a system comprising a processor, that an emergency situation exists at an emergency location. Example operation 1304 represents determining by the system, that a user device is at a first location proximate to the emergency location. Example operation 1306 represents obtaining, by the system, permission data indicating that communications made via the user device are accessible to a responder entity. Example operation 1308 represents obtaining, by the system, communications data representing the communications made via the user device. Example operation 1310 represents presenting, by the system, the communications data to a responder device of the responder entity.

Obtaining the permission data can include accessing information indicating prior granting of permission based on user input received via the user device.

Further operations can include filtering, by the system, the communications data from a group of candidate communications of the user device based on a filtering criterion.

Presenting the communications data to the responder device can include outputting an augmented reality presentation, and wherein the communications data is presented as part of the augmented reality presentation.

Figure 14:
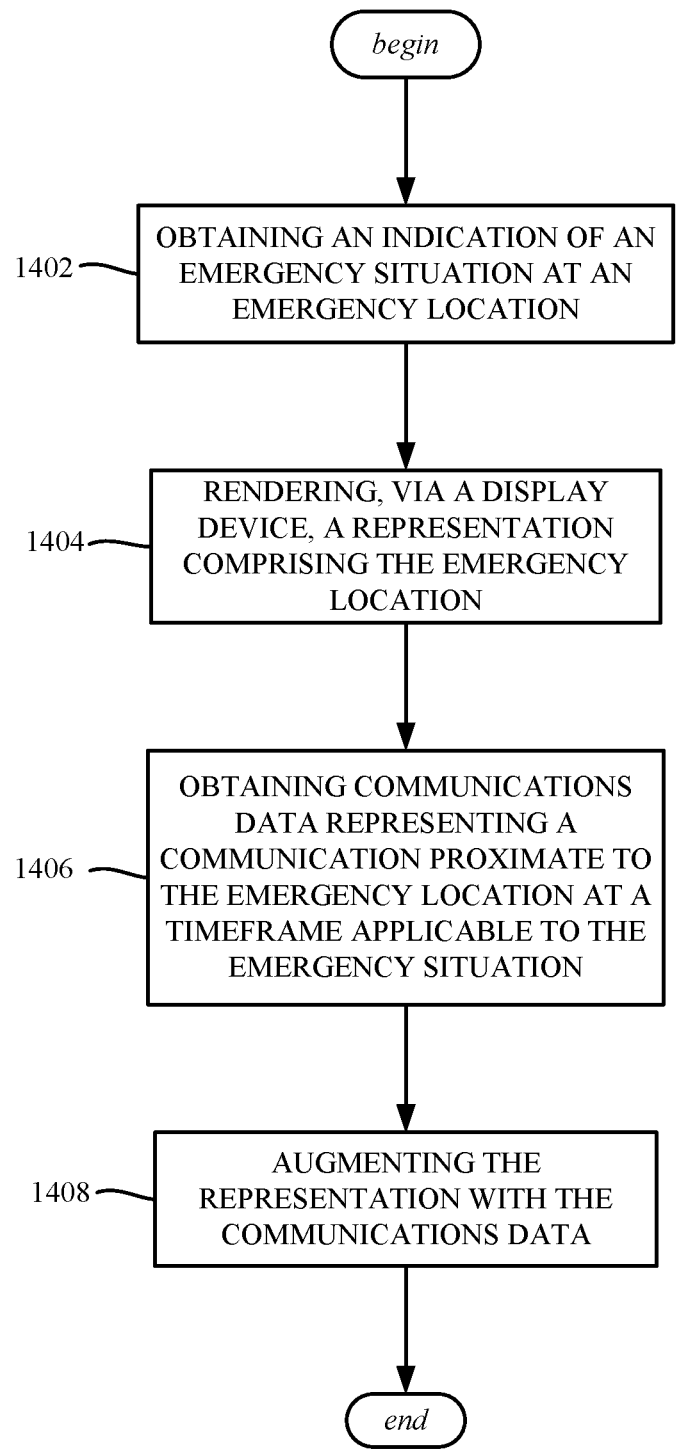
FIG. 14 is a flow diagram representing example operations related augmenting a representation that includes an emergency location with communications data, in accordance with various aspects and embodiments of the subject disclosure.

One or more aspects are represented in FIG. 14, such as implemented in a machine-readable medium, including executable instructions that, when executed by a processor, facilitate performance of operations. Example operation 1402 represents obtaining an indication of an emergency situation at an emergency location. Example operation 1404 represents rendering, via a display device, a representation comprising the emergency location. Example operation 1406 represents obtaining communications data representing a communication proximate to the emergency location at a timeframe applicable to the emergency situation. Example operation 1408 represents augmenting the representation with the communications data.

Further operations can include obtaining permissions data allowing access to the communications data, and filtering the communications data from a group of candidate communications based on relevance to the emergency situation.

As can be seen, the technology described herein facilitates access by responders to an emergency situation to communication data involving persons who were at or are at the location of the situation at an appropriate time. The communications include those which provide information that are likely helpful to the responders in handling the situation. The communications are not those in which a user is in communication with any emergency response personnel, (although such communications can also be used).

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 15:
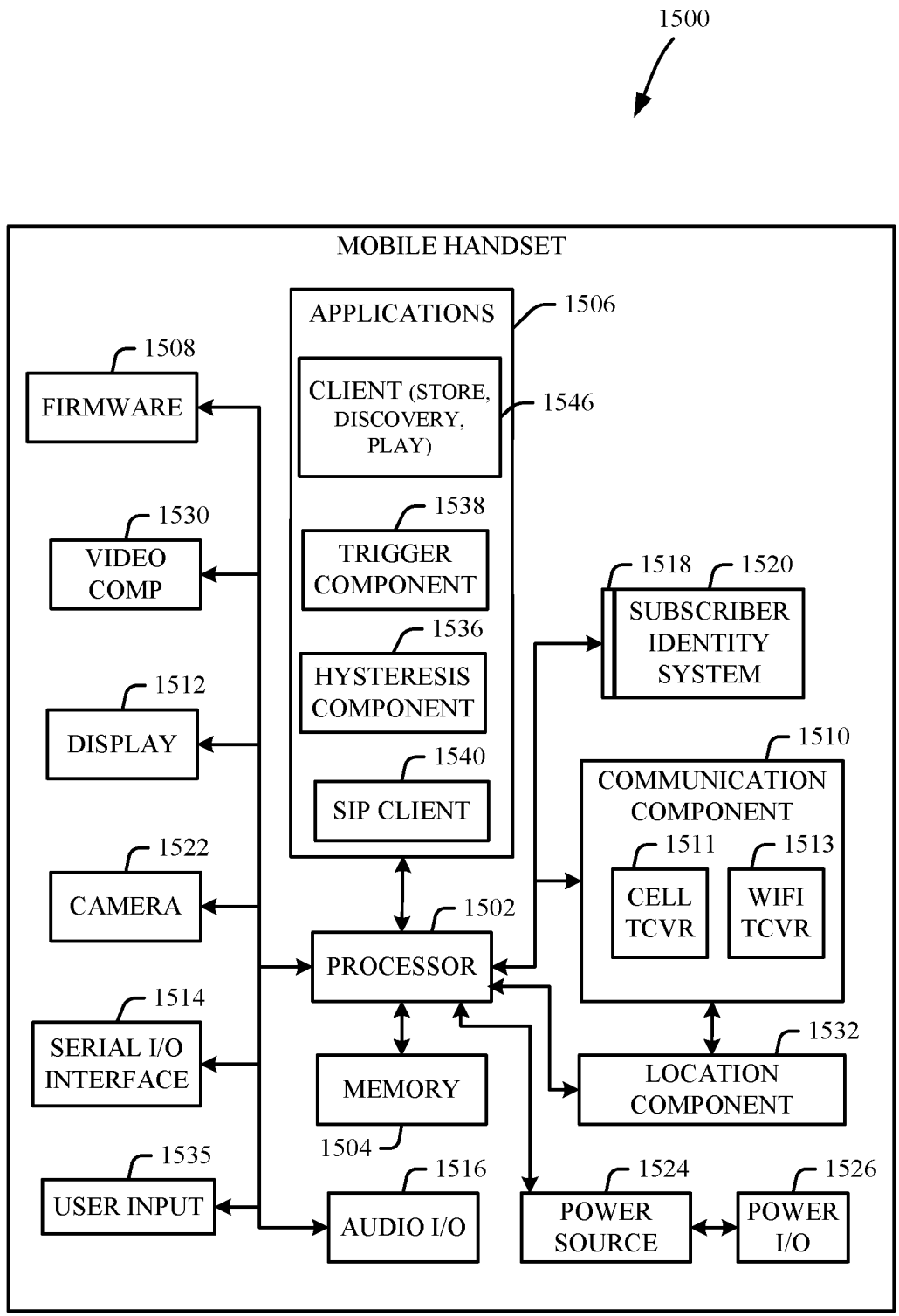
FIG. 15 illustrates an example block diagram of an example mobile handset operable to engage in a system architecture that facilitates wireless communications according to one or more embodiments described herein.

Referring now to FIG. 15, illustrated is a schematic block diagram of an example end-user device (such as user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
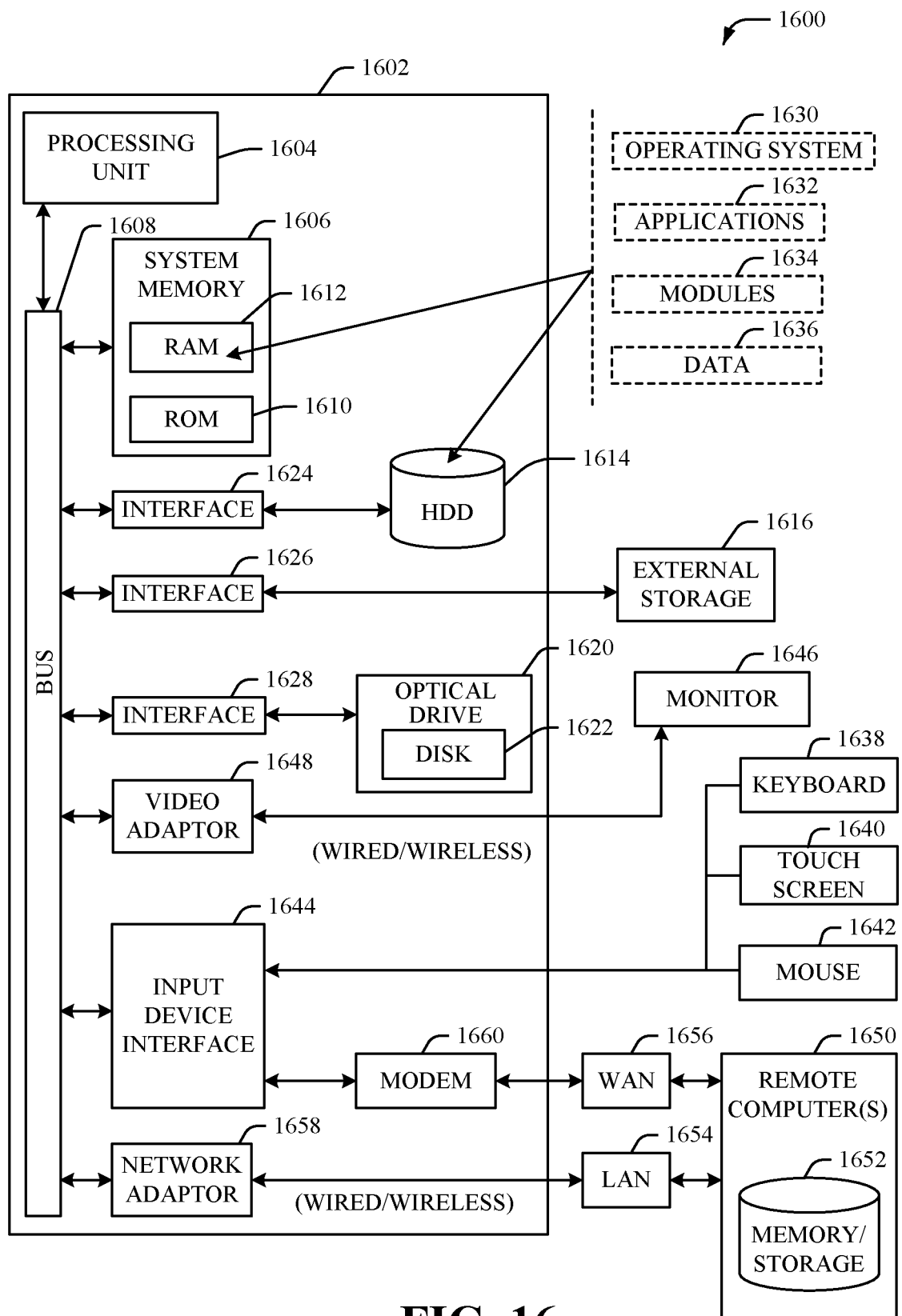
FIG. 16 illustrates an example block diagram of an example computer/machine system operable to engage in a system architecture that facilitates wireless communications according to one or more embodiments described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD), non-volatile memory and other storage technology could be used in addition to, or in place of, an HDD 1614, and can be internal or external. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally include emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can include one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 16 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
      receiving location data representative of a location of a first device associated with a first party;
      determining, based on the location data, that the first party is proximate to an emergency situation location;
      receiving communication data describing an audio communication, via the first device associated with the first party and a second device associated with a second party, between the first party and the second party;
      characterizing, based on a tone of voice used in the audio communication, the audio communication as relevant or irrelevant; and
      responsive to the audio communication being characterized as relevant, presenting the communication data to a responder device associated with a responding entity.

2. The system of claim 1, wherein the operations further comprise obtaining permission data from the first party indicating permission to receive the communication data describing the communication between the first party and the second party.

3. The system of claim 2, wherein the obtaining of the permission data from the first party comprises sending an alert to the first device associated with the first party, and receiving the permission data in response to the alert.

4. The system of claim 1, wherein the presenting comprises presenting for display, and wherein the operations further comprise outputting information indicative of the location data in association with the presenting, for display, the communication data to the responder device associated with the responding entity.

5. The system of claim 1, wherein the communication data describing the audio communication further comprises at least one of: text data, image data, or video data.

6. The system of claim 1, wherein the operations further comprise outputting directional guidance to the second device.

7. The system of claim 1, wherein the presenting comprises outputting an augmented reality presentation for display.

8. The system of claim 7, wherein the operations further comprise accessing a data store to obtain a group of location points, and wherein the augmented reality presentation comprises augmented information based on the group of location points.

9. The system of claim 8, wherein the group of location points corresponds to a structure, and wherein the outputting of the augmented reality presentation comprises rendering a representation of the structure based on the group of location points.

10. The system of claim 9, wherein the outputting of the augmented reality presentation further comprises overlaying augmented information over the representation at an overlay position based on the location data.

11. The system of claim 9, wherein the representation of the structure comprises at least one of: a three-dimensional rendering of the structure, or a two-dimensional floor plan of a floor of the structure.

12. The system of claim 9, wherein the representation of the structure comprises a semi-transparent three-dimensional rendering of the structure, or a two-dimensional floor plan of a floor of the structure.

13. The system of claim 1, wherein the location data is first location data representative of a first location, wherein the communication data is first communication data, and wherein the operations further comprise:
   receiving second location data representative of a second location of a third device associated with a third party;
   determining, based on the second location data, that the third party is proximate to the emergency situation location;
   receiving second communication data describing a second communication, via the third device associated with the third party and a fourth device associated with a fourth party, between the third party and the fourth party; and
   presenting, for display, the second communication data to the responder device associated with the responding entity.

14. The system of claim 1, wherein the communication data is presented to the responder device as an audio presentation, as a transcribed audio presentation, or any combination thereof.

15. A method, comprising:
   determining, by a system comprising a processor, that an emergency situation exists at an emergency location;
   determining by the system, that a user device is at a first location proximate to the emergency location;
   obtaining, by the system, permission data indicating that communications made via the user device are accessible to a responder entity, wherein the communications comprise audio communications;
   obtaining, by the system, communications data representing the audio communications made via the user device;
   characterizing, based on a tone of voice used in the audio communications, the audio communications as relevant or irrelevant; and responsive to the audio communications being characterized as relevant, presenting, by the system, the communications data to a responder device of the responder entity.

16. The method of claim 15, wherein the obtaining of the permission data comprises accessing information indicating prior granting of permission.

17. The method of claim 16, wherein the prior granting of permission is based on user input received via the user device.

18. The method of claim 15, wherein the presenting of the communications data to the responder device comprises outputting an augmented reality presentation, and wherein the communications data is presented as part of the augmented reality presentation.

19. A non-transitory machine-readable medium, comprising executable instructions that, when executed by a processor, facilitate performance of operations, the operations comprising:

obtaining an indication of an emergency situation at an emergency location;

rendering, via a display device, a representation comprising the emergency location;

obtaining communications data representing an audio communication proximate to the emergency location at a timeframe applicable to the emergency situation;

characterizing, based on a volume used in the audio communication, the audio communication as relevant or irrelevant; and responsive to the audio communication being characterized as relevant, augmenting the representation with the communications data.

20. The non-transitory machine-readable medium of claim 19, wherein the operations further comprise obtaining permissions data allowing access to the communications data.

* * * * *